3,276,828
ANTIFRICTION BEARINGS INCLUDING MEANS FOR COUPLING THEM TO SHAFTS
Roland M. Mansfield, Wilton, Conn., assignor to Stephens-Adamson Mfg. Co., Aurora, Ill., a corporation of Illinois
Continuation of application Ser. No. 165,710, Dec. 29, 1961. This application Nov. 17, 1965, Ser. No. 508,246
4 Claims. (Cl. 308—236)

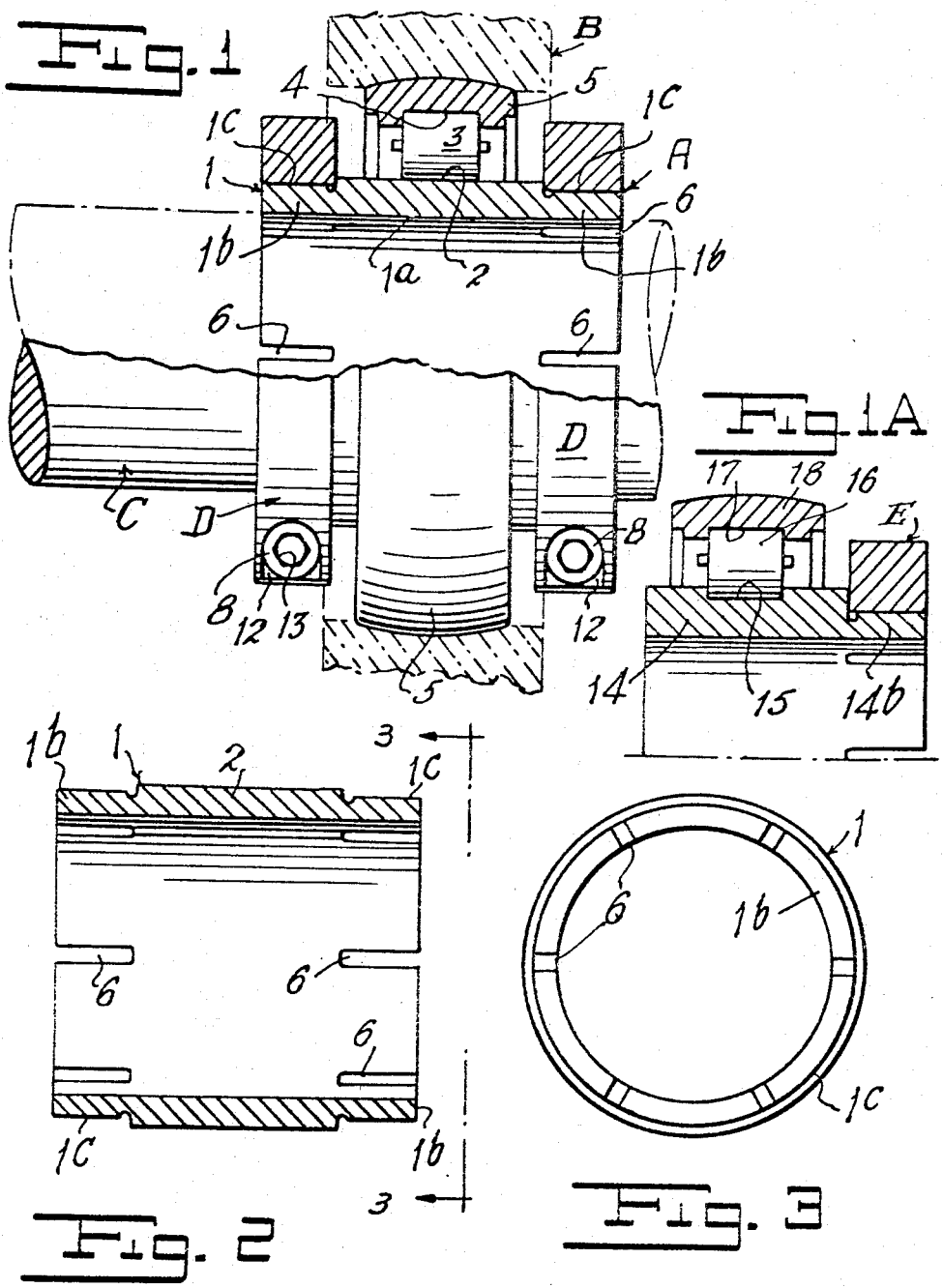

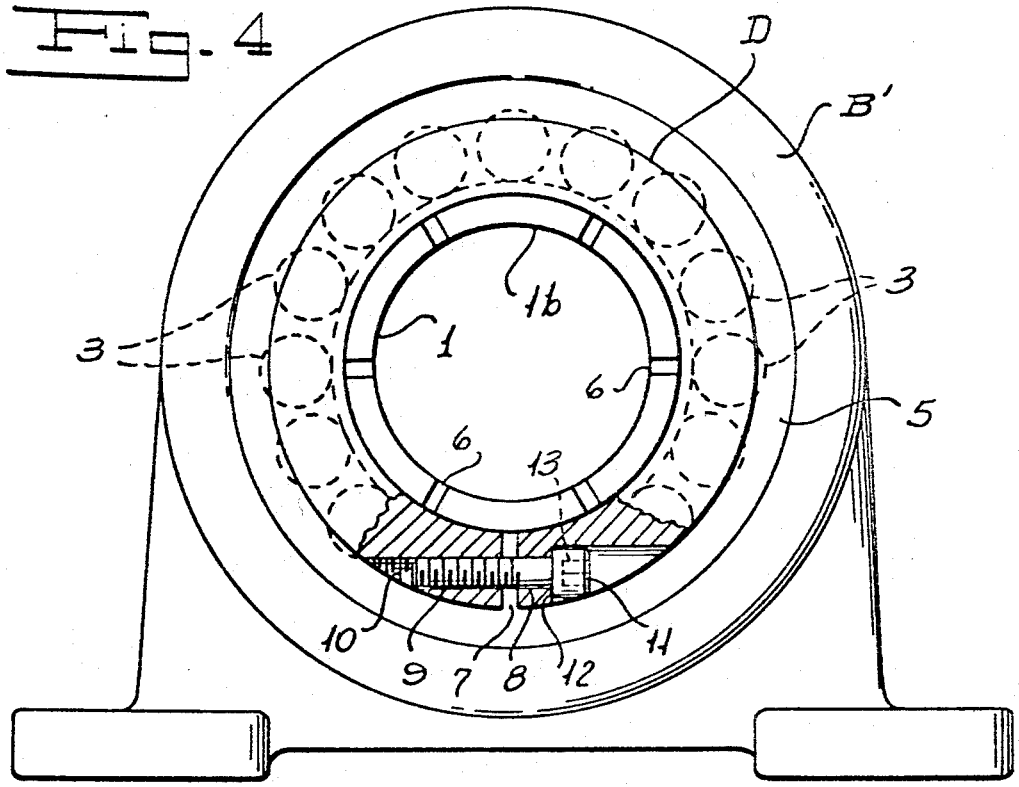
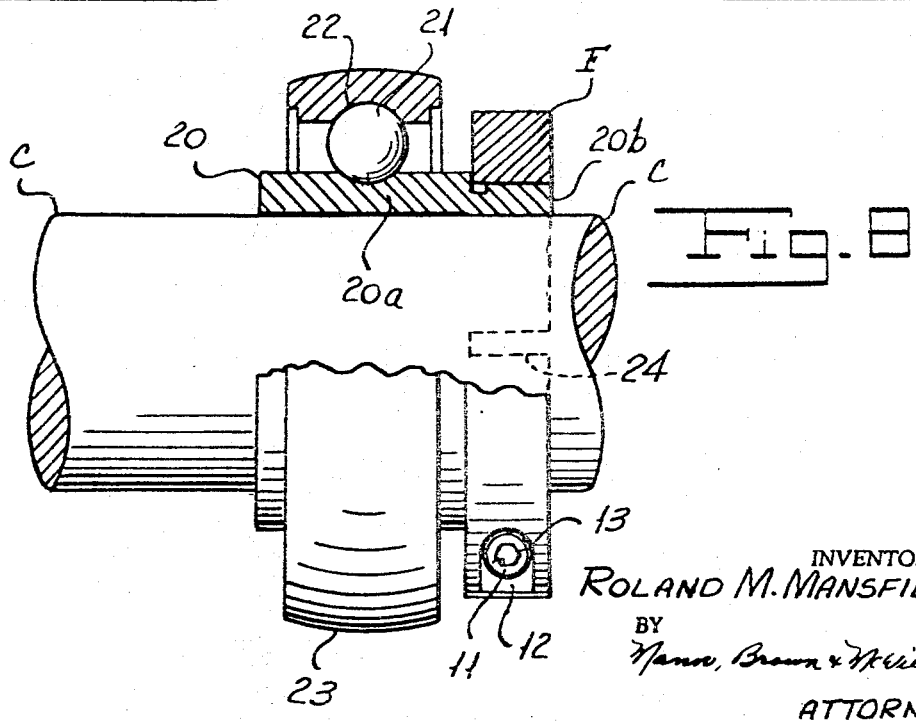

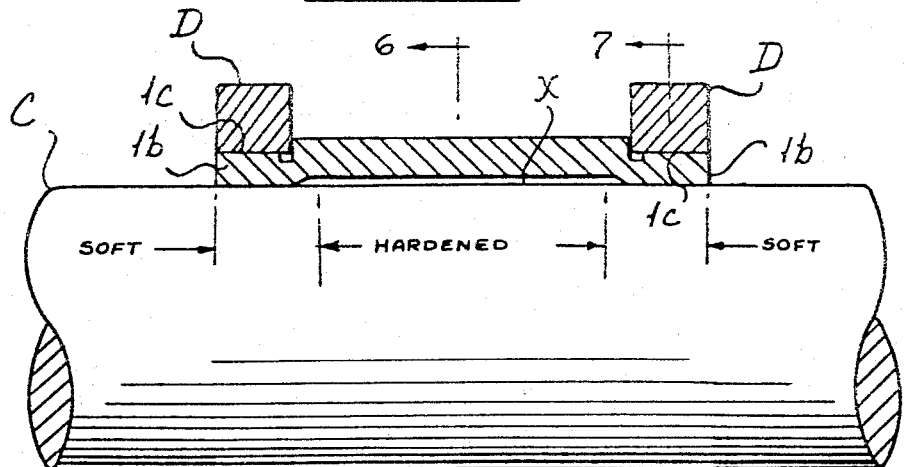
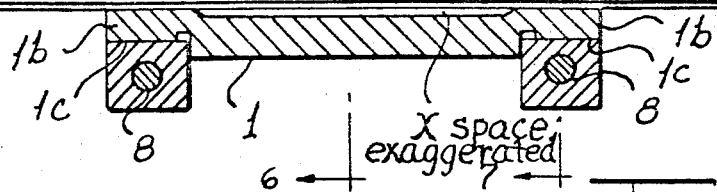
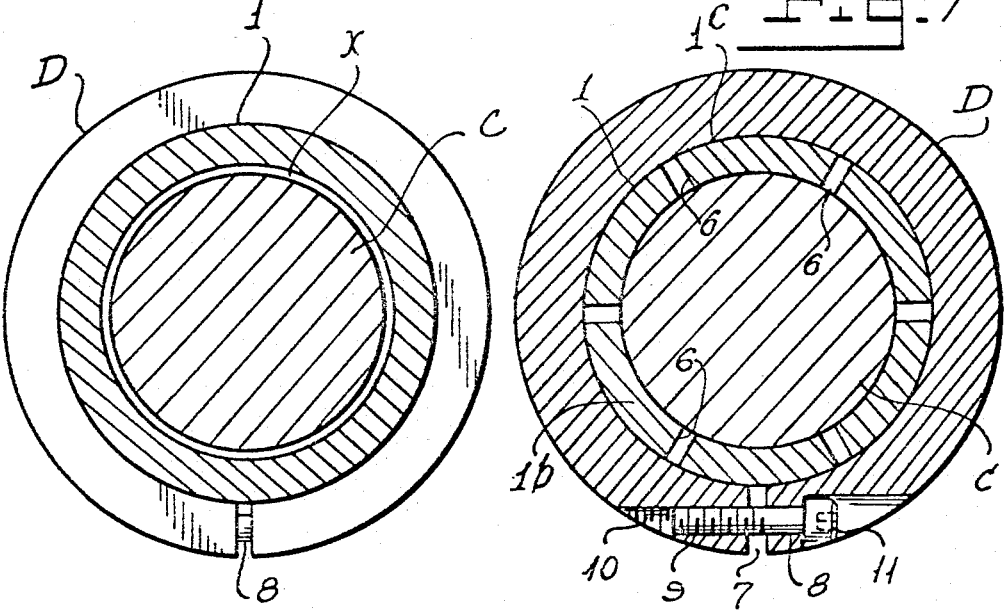

This application is a continuation of my copending application filed December 29, 1961, Serial No. 165,710, and the entire disclosure of that application is hereby incorporated by reference, and said prior application is in turn a continuation-in-part of my earlier application filed February 24, 1961, Serial No. 91,486.

This invention relates particulary to a method and means for coupling or fixedly connecting the inner race rings of roller bearings or ball bearings to shafts.

The most common methods and means for locking the inner race ring of a bearing onto a shaft comprise set screws threaded through the race ring or through a cam-action locking collar attached to the race ring and tightened against the portion of the shaft that is disposed in the race ring, and these constructions are not entirely satisfactory for several reasons, one of which is that, especially when the shaft is somewhat undersized, the race ring is clamped eccentrically on the shaft so that frequently fretting corrosion between the inner surface of the race ring and the shaft occurs and interferes with the removal of the race ring from the shaft, sometimes to the extent that the bearing must be burned off the shaft and replaced. Also, often the raceway is rapidly excessively worn so as to shorten the life of the bearing, and the set screws cause burrs or score marks on the shaft so as to make it difficult to remove the bearing from the shaft and to apply another bearing to the shaft.

A primary object of the present invention is to provide an antifriction bearing which shall embody novel and improved features of construction whereby the inner race ring of a roller bearing or a ball bearing can be connected to a shaft in such a manner as to eliminate or substantially reduce the objections and disadvantages incident to use of the known means for fixedly connecting antifriction bearings to shafts.

Another object is to provide novel and improved means whereby the inner race ring of a roller bearing or ball bearing can be rigidly connected to a shaft in perfectly axially aligned relation to the shaft without the use of set screws so as to insure long life of the bearing and the shaft and also provide for easy and quick connection and disconnection of the bearing to and from the shaft with a minimum of danger of injury to the bearing or the shaft.

Still another object of the invention is to provide such a combination of a roller bearing or a ball bearing and coupling means for coupling the bearings to a shaft, wherein the intermediate zone of the race ring shall constitute the raceway and shall be hardened in any suitable known manner, while at least one end portion of the race ring shall be relatively soft or ductile but possesses some inherent resiliency so that at least said end portion of the race ring can be tightly clamped on a shaft in uniform contact with the shaft throughout its circumference and in perfectly axially aligned relation thereto to lock the race ring on the shaft, while the hardened intermediate zone of the race ring shall be slightly spaced from or free of contact with the shaft, and there is a minimum of or no fretting of the shaft by the bearing and there is a large area of contact between the relatively soft end portion of the race ring and the shaft to provide a firm mounting of the bearing on the shaft.

Other objects, advantages and results of the invention will be brought out by the following description in conjunction with the accompanying drawings in which:

FIGURE 1 is a complete front elevation and central longitudinal sectional view of a roller bearing, a shaft and a coupling means embodying the invention at both ends of the inner race member, the bearing being schematically illustrated as mounted in a housing that is fragmentarily illustrated in dot-and-dash lines;

FIGURE 1A is a fragmentary central longitudinal sectional view through another type of bearing including the coupling embodying the invention;

FIGURE 2 is a central vertical sectional view through the inner race member of the bearing;

FIGURE 3 is an end elevation thereof taken from the plane of the line 3—3 of FIGURE 2;

FIGURE 4 is a side elevation of a bearing assembly including the bearing shown in FIGURE 1 mounted in a pillow block;

FIGURE 5 is a schematic central longitudinal section through the inner race member of the bearing and the coupling means, illustrating in an exaggerated manner, the relationship of the end portions and the hardened raceway zone of the race member to the shaft;

FIGURE 6 is a transverse vertical sectional view on the plane of the line 6—6 of FIGURE 5;

FIGURE 7 is a similar view on the plane of the line 7—7 of FIGURE 5; and

FIGURE 8 is a central longitudinal sectional view through a ball bearing having coupling means at only one end of the inner race member.

The invention has been shown in FIGURES 1 to 4, inclusive, as embodied in a bearing assembly that comprises a rolling bearing unit generally designated A mounted for self-alignment through conventional loading slots (not shown) in a suitable housing B such as the known type of pillow block B' shown in FIGURE 4. This type of pillow block, having loading slots for receiving a self-aligning bearing, is shown for example in Shafer U. S. Patent No. 2,501,100.

The bearing unit is a roller bearing especially designed for use where heavy radial loads are encountered. More particularly, the bearing unit includes an inner race member or ring 1 whose internal periphery or surface 1a is initially cylindrical and of a diameter throughout its length slightly greater than the diameter of the shaft C to be connected to the bearing. The intermediate or body portion of the race ring constitutes a cylindrical smooth raceway 2 for a complement of rollers 3 that also roll in the raceway 4 of an outer race ring or member 5. The zone of the inner race ring that constitutes the raceway is hardened in any suitable known manner, such as the induction hardening method, leaving the end portions 1b of the race ring unhardened, or in a relatively soft or ductile state but possessing some inherent resiliency. A hardened raceway could be produced by the known plating method, but in either case the end portions 1b are relatively soft but resilient compared with the intermediate zone.

In accordance with the invention, the said end portions 1b constitute clamping extensions of the body and are provided with longitudinal slots 6 spaced circumferentially of the race ring and extending from the corresponding end surface of the ring inwardly a substantial distance, for example ⅝ of an inch when the internal diameter of the race rings is of the order of 1⁷⁄₁₆ inches. The number of slots will vary, depending upon the size of the inner race ring; for example, for a ½ inch to 2¹⁵⁄₁₆ inches I.D. there would be six slots, while for an I.D. of 3 inches to 5 inches there would be eight slots, and for an I.D. of 8¹⁄₁₆ inches to 12 inches, twelve slots probably would be used. The extended end portions 1b of the race ring must be of proper wall thickness to allow contraction thereof, that is to permit the portions between the slots, which are in effect fingers, to be pressed tightly against the shaft C to lock the race ring on the shaft. This thickness will vary with the diameter of the race ring; in the specific case above described, with an I.D. of 1 7/16 inches, the race ring would have end portions 1b of a thickness of about ¼ of an inch.

It should be noted that the outer periphery of the outer race, not only in FIGS. 1–4 inclusive, but also FIG. 8, is spherically shaped, and cooperates with the correspondingly shaped inner periphery of the housing to allow the bearing unit to adjust within the housing for slight misalignment of the shaft with respect to the axis of the housing. This type of bearing is conventionally known as a self-aligning bearing. It will also be noted that the clamping extensions 1b fall within the outer spherical surface of the outer race, if extended in space, so that the bearing assembly A may be introduced into, and locked within the housing B, in the conventional manner described in said Shafer Patent No. 2,501,100.

This compressing of the end portions of the race ring against the shaft is preferably accomplished as follows: In FIGURES 1 to 4, inclusive, the outer peripheries of the end portions are preferably smooth and cylindrical as indicated at 1c and of a length approximately the same as the length of the slots 6; and a split clamping ring D encircles each end portion 1b in contact with the outer surface 1c. The split ring D has some inherent resiliency and its internal diameter is normally approximately the same as the external diameter of the surface 1c of the race ring. The two ends of the clamping ring are normally spaced apart as indicated at 7 and are connected together by a screw 8 that has a threaded shank 9 screwed into a correspondingly threaded socket 10 in one end of the clamping ring, and has a head 11 abutting a shoulder 12 on the other end of the ring. The head may have an external polygonal contour or a polygonal socket 13 for coaction with an appropriate wrench to facilitate tightening and loosening of a screw. Obviously, rotation of the screw in one direction will draw the ends of the clamping ring together so as to tighten it around the corresponding end portion 1b of the race ring and at the same time compress the portions of the race ring between the slots 6 into tight contact with the shaft C as best shown in FIGURES 5, 6 and 7 and thereby connect the race ring to the shaft, while rotation of the screw in the opposite direction will loosen the clamping ring and permit the end portions of the race ring to spring away from the shaft so that the race ring can be slid along the shaft for adjustment or for attachment or for removal. It will be observed that this clamping results in leaving the hardened intermediate zone of the inner race ring that provides the raceway 2 slightly spaced from and free of contact with the shaft as indicated in an exaggerated manner at X in FIGURES 5 and 6 because the internal diameter of the hardened intermediate portion of the race ring remains as it was initially made, that is, of slightly greater diameter than the shaft, but the internal diameter of the relatively ductile end portions is reduced throughout the major portions of the lengths thereof by the tightening of the clamping rings so that the internal peripheral surfaces of the end portions are in tight uniform contact with the shaft throughout the circumference thereof and in large areas of the shaft along the length thereof. With this construction, as shown in FIGURES 1, 4, 5, 6, and 7, the major portion of the load on the bearing is transmitted to the shaft through the relatively soft end portions 1b of the inner race ring and fretting of the shaft by the intermediate portion of the inner race ring is reduced to the minimum if not entirely eliminated.

Experience has shown that with this construction and means for clamping the inner race of a self-aligning bearing to a shaft, the shaft, when having a diameter up to about two inches, may be as much as 0.003 of an inch undersize, and in some instances as much as 0.008 of an inch undersize, without jeopardizing or seriously detracting from the effectiveness of the clamping action on the shaft. The tolerance of commercial shafting is dependent on the diameter of the shaft, material of construction and method of manufacture (see Ryerson Data Book, Steel and Aluminum, Joseph T. Ryerson & Son, Inc., 1958). This has the important consequence that commercial cold-drawn carbon steel shafting, which in sizes up to about two inches, for instance, is guaranteed by suppliers to have a diameter tolerance no greater than 0.008 of an inch, may be used with substantial savings in the initial cost of the shafting, whereas, in contradistinction, prior art conventional bearings of similar size generally require a shaft tolerance of zero to minus 0.0005 of an inch or at best 0.001 of an inch which requires not just cold-drawn shafting, but cold-drawn shafting ground and polished with select tolerances, which experience has shown in the case of shafts of this size, may cost as much as 55% more than straight cold-drawn shafting with its specified tolerance of zero to minus 0.008 of an inch.

A further advantage in having a bearing clamping device which permits an undersize tolerance as much as 0.003 of an inch, or even more, is the fact that when a shaft has been worn to a smaller diameter by the use of a conventional bearing with set screws, it is not necessary to replace the shaft when a replacement bearing is required, even though the shaft has been worn to minus tolerances greater than about 0.0005 of an inch or 0.001 of an inch in the area of the bearing application.

Still another advantage in the bearing clamping device of this invention is the fact that it does not create burrs as in the case of set screws, which means that the bearing can be readily removed when desired. Experience has taught that it is often very difficult and time-consuming to remove a conventional bearing when set screws, or other like locking devices, have produced burrs which interfere with the removal of the bearing.

It will be observed that this is in sharp contrast to the prior art structures wherein the load on the bearing is transmitted to the shaft through set screws or by clamping rings having a tapered screw threaded connection with the end portion of the race member in bearings of the type shown in Patent No. 2,168,469.

FIGURE 1A shows a modification of the invention wherein the inner race ring 14 has a recessed raceway 15 for rollers 16 that also roll in a recessed raceway 17 of the outer race ring 18, and the inner race ring has only one end portion 14b corresponding to one of the end portions 1b and with which is associated a clamping ring E that may be identical with the ring D. Such a bearing would be used ordinarily where the radial loads are heavy and the thrust loads are moderate.

FIGURE 8 shows a modification of the invention embodied in a ball bearing. The bearing has an inner race ring 20 that has an intermediate zone-hardened portion 20a to provide a raceway for a complement of balls 21 that roll in a raceway 22 in the outer race ring 23. In this form of the invention only one end of the inner ring has a relatively soft extension as indicated at 20b which is provided with slots 24 corresponding to the slots 6, and also has a clamping ring F similar to one of the clamping rings D encircling said end portion 20b. The connection and disconnection of the inner race ring to and from a shaft can be effected in exactly the same way as described in connection with FIGURES 1 to 4, inclusive, except, of course, that there is only one clamping ring to tighten instead of two. This type of bearing is particularly useful for light loads, whereas the double-end lock of the inner race ring on the shaft as shown in FIGURE 1 is desirable for heavy duty bearings.

It will be observed that with all forms of the invention, an exceptionally secure clamping of the clamping or coupling extensions 1b, 14b and 20b of the inner race rings upon the corresponding shafts is insured with no danger of burring, scoring or otherwise damaging the shaft. Moreover, accurate coaxial alignment of the inner race ring with the shaft can be obtained with a minimum atention on the part of the operator, and there is a large area of substantially uniform contact between the clamping extensions and the shaft. Another important advantage of the construction as hereinbefore indicated is that the possibility of relative motion or vibration of the inner race ring such as might cause fretting corrosion or excessive wear of the raceway or the shaft is reduced to the minimum. From the foregoing, it will readily appear that the main factors in achieving these results are the relatively soft slotted clamping extensions having approximately cylindrical inner and outer surfaces and the split clamping ring having approximately cylindrical inner peripheries.

It will also be understood by those skilled in the art that the invention may be embodied in other types of roller or ball bearings, and that the details of construction of the bearing and coupling means may be modified and changed, all within the spirit and scope of the invention.

I claim:

1. In a bearing structure of the type having a one piece inner race adapted to be applied to a cylindrical shaft and be secured thereto, an outer race concentrically positioned over the inner race and having a spherical outer surface adapted to be received within a complemental housing for limited tilting movement with respect thereto, and a plurality of rotatable bearing elements positioned in a single raceway between the inner and outer races and providing rolling support for the outer race upon the inner race, the improvement wherein the inner race is hardened, at least in the area of said raceway, and has a lateral extension on one side thereof which is a part of the inner race, and is provided with a plurality of longitudinally extending slots spaced about the circumference of the extension, said slots extending inwardly from the end of the extension to an area short of said raceway, the length of said extension being such that it falls within the radius of said spherical surface as extended, and means for clamping the inner race extension to a shaft having an outer diameter which may be between zero and about .003 inch smaller in diameter than the inner diameter of said inner race in the area of said raceway with substantial elimination of fretting corrosion over long periods of use, said clamping means including said inner race slotted extension and an annular collar fitted over said extension, said collar being non-continuous in at least one place in its circumference to provide adjacent portions, and screw means adapted to draw together said adjacent portions to deflect said slotted extension inwardly into firm concentric clamping engagement with the shaft.

2. A bearing structure as set forth in claim 1 in which the rotatable bearing elements are ball bearings and the inner and outer races are grooved to form said bearing raceway.

3. A bearing structure as set forth in claim 1 in which the inner race has slotted extensions on both sides thereof, and said clamping means include clamping collars for both extensions whereby the hardened portion of said inner race in the area of said raceway is supported in slight spaced relation to the shaft.

4. A bearing structure as set forth in claim 1, in which the inner race is hardened only in the area of said raceway and the lateral extensions are relatively ductile.

References Cited by the Examiner

UNITED STATES PATENTS

| | | | |
|---|---|---|---|
| 1,561,443 | 11/1925 | Searles | 308—189 |
| 1,778,822 | 10/1930 | Ackerman | 308—226 |
| 2,136,819 | 11/1938 | Large | 308—236 |
| 2,168,469 | 8/1939 | Brouwer | 308—256 |
| 2,501,100 | 3/1950 | Shafer | 308—226 |
| 2,584,740 | 2/1952 | Reynolds | 287—52.09 |
| 2,650,867 | 9/1953 | Spieth | 308—236 |
| 3,036,872 | 5/1962 | King | 308—236 |

FOREIGN PATENTS

| | | |
|---|---|---|
| 513,495 | 11/1920 | France. |
| 509,124 | 10/1929 | Germany. |

DAVID J. WILLIAMOWSKY, *Primary Examiner.*

FRANK SUSKO, *Examiner.*